Feb. 6, 1940.　　　E. SCHAER　　　2,188,959
PIPE CLEANING ELEMENT
Filed June 18, 1937

INVENTOR:
EUGENE SCHAER
BY Alex E. MacRae
ATTORNEY.

Patented Feb. 6, 1940

2,188,959

UNITED STATES PATENT OFFICE 2,188,959

PIPE CLEANING ELEMENT

Eugene Schaer, Fort Frances, Ontario, Canada

Application June 18, 1937, Serial No. 148,928

4 Claims. (Cl. 15—104.06)

This invention relates to a pipe or hose cleaning element of the type adapted for propulsion by liquid pressure through the pipe or hose to be cleaned, such as is disclosed in my co-pending application, filed July 29, 1935, Serial No. 29,059 (now Patent Number 2,085,453), of which this application is a continuation in part.

It has been proposed to use sponge or bristle brushes for this purpose but it is an object of this invention to provide a sponge rubber cleaning surface on the cleaning element which material possesses cleansing advantages over the heretofore employed bristle or ordinary sponge brushes.

Another object is to provide a structure formed substantially wholly of a flexible material such as rubber whereby sufficient flexibility is possessed thereby to negotiate with readiness bends or turns in the pipe or hose being cleaned.

Another object is to provide an element having a central liquid receiving recess at either end whereby the motive power derived from liquid acting thereon is increased.

Another object is to provide means for lubricating with liquid the contacting surfaces of the cleaning element and the pipe or hose being cleaned and for dissipating undesirable vacuum pockets.

Another object is to provide means, in one form of cleaning element, for maintaining a close contact at all times between the cleaning surface of the element and the surface being cleaned despite wear of the cleaning surface.

Figure 1:
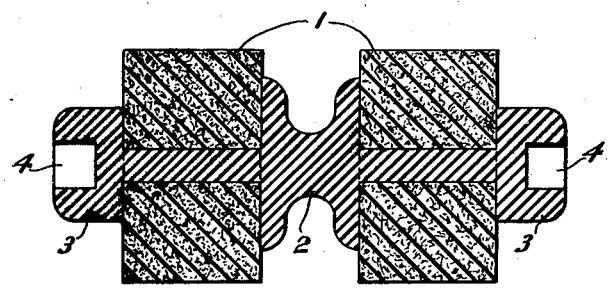
Figure 2:
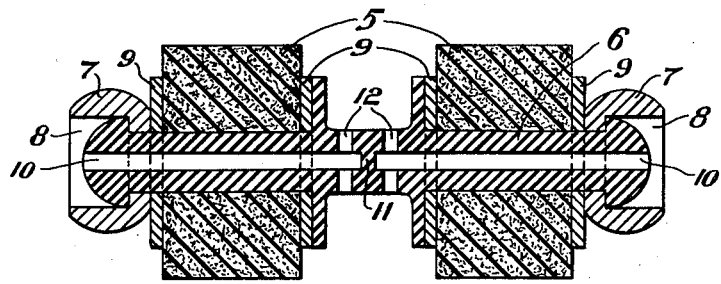
Figure 3:
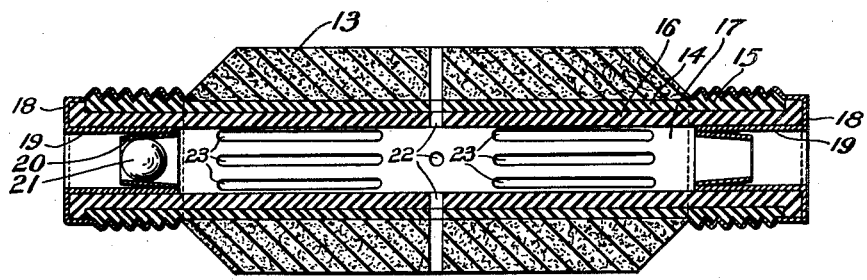

The invention will be described with reference to the accompanying drawing, in which, Figures 1, 2, and 3 are longitudinal sections of three forms of cleaning elements in accordance with the invention.

Referring to Figure 1 of the drawing, cylindrical sponge rubber brushes 1 are mounted in spaced relation on a flexible frame member 2 formed of a relatively stiff rubber having cup-shaped end portions 3 providing recesses 4.

Referring to Figure 2, cylindrical sponge rubber brushes 5 are mounted in spaced relation on a flexible frame member 6 formed of rubber having cup members 7 mounted on either end thereof to provide recesses 8. Supporting washers 9 may be provided. Axial channels 10 are formed in the frame member 6 being separated by a central wall 11 in the member 6. Each channel is provided with a pair of ports 12 adjacent the wall 11 leading to the space between the brushes 5.

Referring to Figure 3, a cylindrical sponge rubber brush 13 is mounted on a soft rubber tube 14 having threaded projecting ends 15 and carried by a flexible retaining frame member 16 formed of relatively stiff rubber of tubular form to provide an axial channel 17 in the element. Threaded end caps 18, which may be of metal, are provided to cooperate with the threaded projections 15 for securing the parts 14 and 16 in assembled relation. Each end cap is formed with a tubular portion 19, which projects within the frame member 16, and within each tubular portion 19 is formed a ball check valve seat 20 for cooperation with a rubber ball check valve 21. Central ports 22 lead from the channel 17 through the members 14 and 16 and the brush 13. A plurality of slots 23 are formed in the frame member 16.

During operation, the sponge rubber brush, besides providing a most satisfactory rubbing surface, also provides a suction cleaning of the pipe surface since the porosity of the rubber creates a partial vacuum where the same is in contact with the lining of the pipe or hose. Moreover, in the cleaning of brewers' beer pipe and hose, the desirable "beer stone" lining which forms therein is unaffected by the use of a sponge rubber brush whereas a bristle or hair brush frequently destroys this lining.

The cupped ends of all three forms of cleaning elements shown ensure that maximum motive power of the water or other cleaning liquid is utilized in propelling the element through the pipe or hose to be cleaned. In the form shown in Figure 3, as the water enters one end of the channel 17, it forces the ball valve 21 into the valve seat 20 at the opposite end.

In the forms shown in Figures 2 and 3, lubrication of the brushing surfaces of the element is effected by supplying water thereto through one of the channels 10 and ports 12, as shown in Figure 2, or through the channel 17 and ports 22, as shown in Figure 3. The flow of water out of the ports mentioned, which it will be noted occurs in both directions of travel of the element, also carries with it any accumulation of dirt or slime and provides for the escape of air and dissipation of vacuum pockets which may occur, for instance, between the brushes 5, in the form shown in Figure 2, or within the channel 17, in the form shown in Figure 3.

In the form shown in Figure 3, the construction described ensures a close contact of the rubbing surfaces of the brush with the surfaces to be cleaned despite wear of the rubbing surfaces of the brush. This is effected by the action of water or other liquid pressure acting through the slots 23 on the soft rubber tube 14 which expands the same and maintains at all times during the cleaning operation a pressure contact between the brush and pipe or hose lining.

Since each of the cleaning elements described is formed substantially entirely of rubber, they possess the necessary flexibility for proper negotiation of the bends or turns in hose, coils or pipes.

I claim:

1. A hose or pipe cleaning element adapted to be propelled through a hose or pipe to be cleaned by a flow of liquid acting on either end thereof comprising a tubular flexible frame formed of relatively hard rubber, a tubular swabbing member formed of relatively soft rubber surrounding and carried by said frame, valve means at both ends for closing either end of said tubular frame responsive to flow of liquid from the other end, to close same, and means whereby liquid under pressure may be directed against the inner surface of said tubular swabbing member to expand the same comprising a plurality of passages leading from the inside of said tubular frame to the inner surface of said tubular swabbing member.

2. A hose or pipe cleaning element adapted to be propelled through a hose or pipe to be cleaned by a flow of liquid acting on either end thereof comprising a tubular flexible frame, a tubular swabbing member surrounding and carried by said frame, and valve means at both ends for closing either end of said tubular frame responsive to flow of liquid from the other end to close same.

3. A hose or pipe cleaning element as defined in claim 2 wherein said valve means comprises a pair of valve seats, one adjacent each end of the tubular frame and a ball valve within the tubular frame and adapted for cooperation with either valve seat.

4. A hose or pipe cleaning element adapted to be propelled through a hose or pipe to be cleaned by a flow of liquid acting on either end thereof comprising a tubular flexible frame, a tubular swabbing member surrounding and carried by said frame, and valve means at both ends for closing either end of said tubular frame responsive to flow of liquid from the other end to close same, said element having liquid outlet ports extending from within said tubular frame to the outer surface of the tubular swabbing member.

EUGENE SCHAER.